United States Patent [19]
Rehmat et al.

[11] Patent Number: 5,958,360
[45] Date of Patent: Sep. 28, 1999

[54] ABSORBER FOR LIQUID REDOX PROCESSES

[75] Inventors: Amirali G. Rehmat; Michael C. Mensinger, both of Darien; Dennis Leppin, Chicago, all of Ill.

[73] Assignee: Gas Research Institute, Chicago, Ill.

[21] Appl. No.: 09/019,957

[22] Filed: Feb. 6, 1998

Related U.S. Application Data

[60] Provisional application No. 60/038,831, Feb. 7, 1997.

[51] Int. Cl.$^6$ .................................................. C01B 17/05
[52] U.S. Cl. ........................... 423/573.1; 423/576.4; 423/576.5; 423/576.6; 423/DIG. 9; 209/710; 209/724; 209/932
[58] Field of Search ............... 423/573.1, 576.4, 423/576.5, 576.6, DIG. 9; 209/710, 724, 932; 261/79.1

[56] References Cited

U.S. PATENT DOCUMENTS

| | | | |
|---|---|---|---|
| 2,354,678 | 8/1944 | Fisher | 261/79.2 |
| 3,050,919 | 8/1962 | Tailor | 55/90 |
| 3,412,529 | 11/1968 | Tailor | 55/94 |
| 3,566,582 | 3/1971 | Yankura | 55/92 |
| 3,642,129 | 2/1972 | McDaniel et al. | 209/159 |
| 3,653,187 | 4/1972 | Petersen | 55/230 |
| 4,171,960 | 10/1979 | Järvenpää | 55/230 |
| 4,485,082 | 11/1984 | Blytas | 423/573 R |
| 4,774,071 | 9/1988 | Jeffrey et al. | 423/573 R |
| 4,810,268 | 3/1989 | Chambers et al. | 55/84 |
| 4,956,091 | 9/1990 | van den Akker | 210/512.2 |
| 5,439,494 | 8/1995 | Tullis et al. | 55/283 |

FOREIGN PATENT DOCUMENTS

| | | |
|---|---|---|
| 885853 | 9/1943 | France . |
| 975037 | 11/1982 | U.S.S.R. . |
| 1577809A1 | 7/1990 | U.S.S.R. . |
| 1820853A3 | 6/1993 | U.S.S.R. . |

*Primary Examiner*—Gary P. Straub
*Assistant Examiner*—Timothy C Vanoy
*Attorney, Agent, or Firm*—Pauley Petersen Kinne & Fejer

[57] ABSTRACT

A method and apparatus for contacting a gas and a liquid such as may be utilized in removing sulfur from gas streams, using a liquid redox process, are provided, which prevent or avoid buildup of elemental sulfur in the process equipment by introducing the hydrogen sulfide contaminated gas through a plurality of gas inlets tangentially distributed within the inner wall of the reaction vessel containing a liquid redox scrubbing solution.

10 Claims, 2 Drawing Sheets

ABSORBER FOR LIQUID REDOX PROCESSES

CROSS REFERENCE TO RELATED APPLICATION

This application claims the benefit of U.S. Provisional application Ser. No. 60/038,831, filed Feb. 7, 1997, the disclosure of which earlier application is hereby incorporated by reference herein and made a part hereof, including but not limited to those portions which specifically appear hereinafter.

BACKGROUND OF THE INVENTION

The present invention relates generally to contact of, by or between a gas and a liquid and, more particularly, to an apparatus for and method of gas and liquid contact such as adapted for use in liquid redox processes for the removal of sulfur from gases, such as natural gas, for example.

Hydrogen sulfide ($H_2S$) is often encountered as a part of or in conjunction with various gas streams, such as in process streams formed or produced in various industrial processes and in natural gas extracted from the ground. In the presence of oxygen, $H_2S$ can form various sulfates. Such sulfates can act as pollutants (which can contribute to acid rain), and can also themselves be corrosive or otherwise damaging to machinery and equipment, as well as storage and transportation devices such as pipelines, for example, with which such materials and associated process streams may come into contact.

Currently, generally at least about 15 percent of U.S. natural gas production is treated for $H_2S$ removal. In general, it is common that high or higher quality natural gas reserves are and have to date been preferentially produced. Thus, it is likely that future natural gas production will include a larger proportion of subquality gas, for example, natural gas which contains sulfur in various amounts.

Various processes for the removal of $H_2S$ from gas streams are know or have previously been proposed. One such process employs a basic agent such as an amine as an absorbent. In practice, such an amine absorbent can be regenerated for reuse as an absorbent through the application of heat, for example, by treatment with steam. A variety of non-regenerative processes using Fe-based solids, or liquid-based processes using caustic triazine, are also widely employed.

A category of processes, termed in the industry as "liquid redox" processes, are frequently used to effect removal of $H_2S$ from $H_2S$-containing natural gas (termed "sour" gas) and other streams. In such processing, the removed sulfur material is commonly converted either to solid elemental sulfur for subsequent sale or to sulfur cake for ultimate disposal. The term "liquid redox" refers to reduction and oxidation processing which is believed to occur in the liquid phase. Generally, in a typical liquid redox process, a reduction-oxidation ("redox") system is used in which sour gas is exposed to a liquid form of sulfide precipitation agent, catalyst material or absorbent (for example, a metal oxide, in which a metal cation changes from a higher valence state to a lower state upon reaction with the $H_2S$), and the gas, now with a substantially reduced level of $H_2S$ (such gas commonly being referred to as "sweet" gas) is piped onward to its intended use. Conventional liquid redox processes typically employ iron in such a reduction-oxidation cycle. In the cycle, the iron is alternately reduced in an absorber yielding elemental sulfur and oxidized in an oxidizer/regenerator yielding water.

After passing through the absorber, at least a portion of the sulfur will have precipitated out of the absorbent solution as elemental sulfur. The precipitation agent/catalyst/absorbent solution is then typically sent to some form of regeneration apparatus, such as an oxidizer, so as to restore the metal cation in the solution to the desired higher valence state, so that the solution upon return to the absorber will again serve to absorb $H_2S$ from the gas stream.

Liquid redox processes are generally not economical for treatment processing of streams which contain very small amounts of sulfur, e.g., where the $H_2S$ concentration is less than a few hundred ppm or the total amount of sulfur is less than a few hundred pounds per day.

For economic reasons, regenerative processes employing liquid redox are more attractively applied to streams where the $H_2S$ concentration is relatively dilute (e.g., no more than a few percent or less) and where the total amount of sulfur removed is above about 50–100 lbs. per day, preferably above about 200–300 lbs. per day, and less than 25 long tons a per day. When conversion to elemental sulfur is desired for environmental or regulatory reasons, such liquid redox processing can be particularly preferred when total sulfur is on the order of 10 tons or less of sulfur per day.

Such liquid redox processes are favored since they operate at ambient temperatures and have high selectivity for $H_2S$. While one of the major attributes of liquid redox processes for removing $H_2S$ from subquality natural gas is the rapid reaction rate of $H_2S$ with the liquid redox solution and the subsequent precipitation of elemental sulfur, the process can be marred by a tendency of the sulfur to deposit on internal contact surfaces in the absorber, such as walls of the absorber itself as well as internal contact surfaces such as may be formed by contact devices such as static mixers, packing and the like which are commonly housed in and used in association with absorbers to facilitate and enhance contact of the gas and liquid.

The tendency for such sulfur deposition primarily emanates from the fact that there is always a zone of stagnant fluid associated with a fixed surface. That is, a thin "boundary layer" of non-moving fluid is commonly present adjacent to non-moving surfaces. As a result, sulfur precipitation and deposition onto such non-moving surfaces adjacent to a non-moving fluid boundary layer can be essentially continuous and can eventually act to block or clog one or more of the absorber and associated processing equipment and piping, for example. For example, should an absorber clog, the absorber must typically be taken out of service and cleaned, resulting in plant downtime and an economic penalty to the user.

One possible technique that could be used to keep such surfaces free from solid sulfur deposits would be to maintain a large flow of recirculated liquid through the absorber to produce turbulence to act to scrub stagnant zones within the absorber. However, in addition to the uncertainty in achieving uniform turbulence throughout the absorber, maintaining a large circulation of liquid can be quite costly both in terms of the additional amounts of absorbent which must be maintained in a circulation loop as well as the increased energy and equipment costs associated with establishing and maintaining such constant circulation and turbulence.

It would therefore be desirable to provide a method and apparatus for assuring the prevention of buildup of elemental sulfur on non-moving surfaces within an absorber, without having to resort to continuous circulation of absorbent within the absorber.

SUMMARY OF THE INVENTION

A general object of the invention is to provide an improved apparatus and method for contacting a gas and a liquid.

A more specific objective of the invention is to overcome one or more of the problems described above.

The present invention comprises in part an improved absorber for liquid redox systems for removal of hydrogen sulfide from "sour" gas. The invention includes an improved absorber structure, in which the sour gas is introduced into the absorber through, preferably, a plurality of inlet apertures which are configured so that the sour gas enters the interior of the absorber substantially tangentially to the wall of the absorber, thus creating a scrubbing effect, for preventing elemental sulfur buildup.

The general object of the invention can be attained, at least in part, through a specific gas and liquid contactor apparatus. The contactor apparatus includes an essentially hollow housing providing direct contact between a liquid and a gas. The liquid is axially introduced into the housing and the gas is tangentially introduced into the housing through a plurality of gas inlet openings tangentially distributed about the housing whereby turbulent mixing of the liquid with the gas is obtained and material deposition on the internal surface of the housing is avoided.

The prior art fails to provide a gas and liquid contactor apparatus and method for contacting a gas and a liquid which avoids or prevents the of buildup, deposition or accumulation of elemental sulfur on non-moving surfaces within the contactor, without having to resort to continuous large scale circulation of contact materials, such as the liquid, within the contactor. In particular, the prior art fails to provide an absorber for a liquid redox process for the removal of sulfur from a gas stream and an associated method for removing sulfur from a gas stream which avoids or prevents such buildup, deposition or accumulation of elemental sulfur on non-moving surfaces within the absorber and does so without resorting to such continuous large scale circulation of absorbent within the absorber.

The invention further comprehends an absorber for a liquid redox process for the removal of sulfur from a gas stream. The absorber includes an elongated housing. The housing provides a contact zone between an axially introduced liquid redox solution and a sulfur-containing gas introduced into the contact zone through a plurality of gas inlet openings tangentially distributed about the housing.

The invention still further comprehends a method for removing sulfur from a gas stream. In accordance with such method, a sulfur-containing gas stream is contacted with a liquid redox solution in an essentially hollow housing. In the housing, the liquid redox solution is passed axially and the sulfur-containing gas stream is tangentially introduced through a plurality of gas inlet openings tangentially distributed about the housing. This results in turbulent mixing of the liquid with the gas with at least a portion of the sulfur originally contained in the gas stream forming a solid, with the mixing preventing deposition of solid sulfur on the internal surface of the housing.

The invention still further comprehends a method for contacting a sulfur-containing gas with a liquid redox solution. Such a method includes the steps of:
 a) passing a liquid redox solution axially through a contact zone of an elongated housing,
 b) tangentially introducing a sulfur-containing gas into the contact zone through a plurality of gas inlet openings tangentially distributed about the housing, and
 c) contacting the axially passing solution with the tangentially introduced gas to form solid sulfur.

In such a method, the tangential introduction of the gas prevents deposition of the solid sulfur on the internal surface of the housing.

As used herein, references to "absorbent agent" are to be understood to generally refer to a precipitation agent, catalyst material, absorbent material and the like employed in liquid redox processing to regeneratively interact with hydrogen sulfide to permit and facilitate the removal thereof Other objects and advantages will be apparent to those skilled in the art from the following detailed description taken in conjunction with the appended claims and drawings.

DETAILED DESCRIPTION OF THE PRESENTLY PREFERRED EMBODIMENTS

The present invention provides an apparatus and method for contacting a gas and a liquid which apparatus and method avoid or prevent solid deposition on internal surfaces of a contactor apparatus without having to resort to continuous circulation of absorbent within the contactor.

Figure 1:
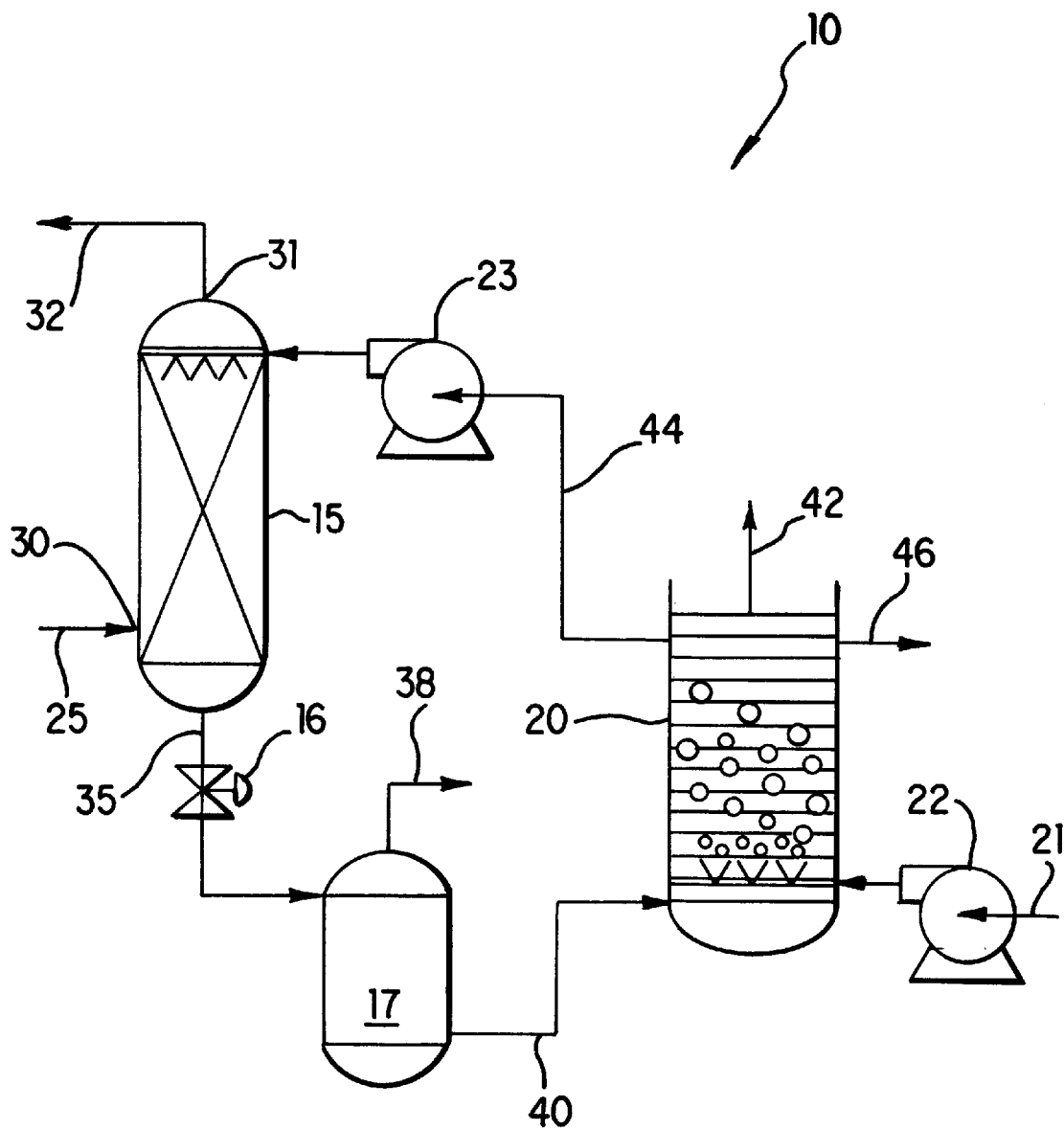
FIG. 1 is a schematic illustration of a liquid redox sulfur removal system in accordance with one embodiment of the invention.

Referring to FIG. 1, a liquid redox hydrogen sulfide removal system, generally designated by the reference numeral 10, is shown. The system 10 includes a gas and liquid contactor or absorber 15, an expansion valve 16, a flash tank 17, an oxidizer or regenerator 20, an air or oxygen source 21 and associated pump 22, and a solution pump 23.

In general, sour gas containing hydrogen sulfide is introduced into the absorber 15 via a conduit 25 at a point 30 and, after hydrogen sulfide has been removed, treated or sweet gas exits from the absorber 15 at a point 31, via a conduit 32.

With the passage of a certain residence time in the absorber 15, hydrogen sulfide contained in the feed gas interacts with an absorbent agent in the absorber 15. Various absorbent agents can be utilized in the practice of the invention, including an absorbent agent selected from a number of known absorbent agents, for example, an absorbent agent bearing iron cations. As a result of interaction between the sour gas and the absorbent agent, elemental sulfur particles precipitate out of the solution, and the metal cation is converted to a metal hydride.

Exhausted solution, bearing elemental sulfur, is processed via a conduit 35 through the expansion valve 16 to relieve the pressure on the solution and subsequently passed on to the flash tank 17. Gases and vapors, composed largely of water vapor, are passed from the flash tank 17 via a conduit 38. Such gases and vapor can be simply vented or flared to the atmosphere or utilized elsewhere within the facility, as may be desired.

Liquid, composed of the exhausted solution, is passed from the flash tank 17, via a conduit 40, to the oxidizer regenerator 20. An oxidizing agent, typically air or other oxygen-bearing gas, is introduced into the regenerator 20 from the source 21, such as via the pump 22. As a result of reaction between the oxidizing agent and the exhausted solution, the metal hydride typically is converted into water, which is vented as moisture with the spent air, shown as a process stream 42, and metal cations (e.g., $Fe^{2+}$) which are returned to the absorber 15 via a process line 44 and the solution pump 23. The sulfur is removed from the oxidizer regenerator 20 via a conduit 46 using any of a number of known techniques for removing elemental sulfur from a liquid, such as by processing with a settling vessel, as is known in the art. Typically, fresh absorbent agent must be periodically added to the system, since some of the redox solution is typically lost with the sulfur removed via the conduit 46.

Figure 2:
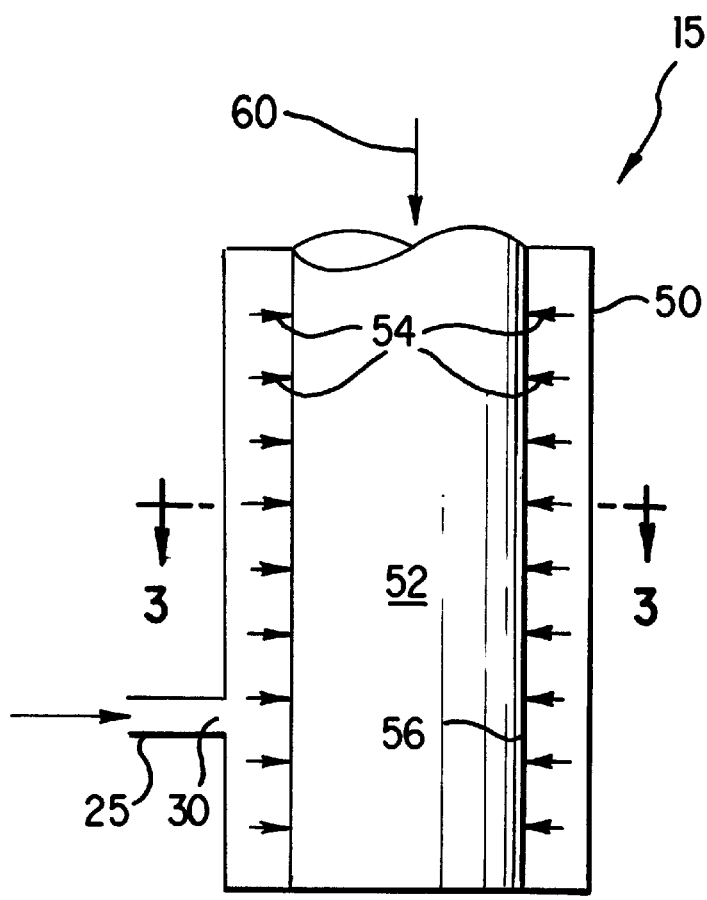
FIG. 2 is a simplified, partial, fragmentary section schematic of the absorber gas and liquid contactor apparatus of the liquid redox sulfur removal system shown in FIG. 1.
Figure 3:
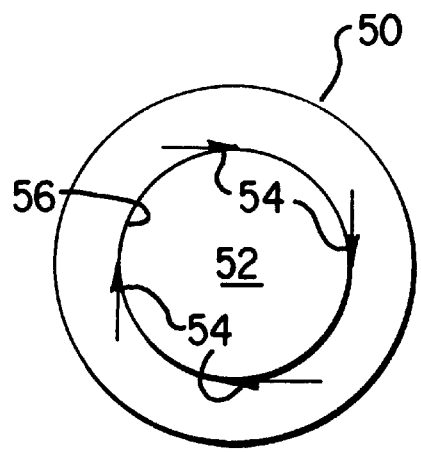
FIG. 3 is a simplified cross sectional schematic of the absorber gas and liquid contactor apparatus of FIG. 2 taken substantially along the line 3—3 of FIG. 2 and viewed in the direction of the arrows.

A section of the absorber 15, designated by the reference numeral 50 and in accordance with a preferred embodiment of the invention, is shown in FIGS. 2 and 3. As shown, the absorber 15 has an improved configuration, in which the subquality ("sour") gas enters an inner absorber region, e.g., a contact zone 52, through a plurality of spaced tangential inlets 54. The tangential inlets 54 are preferably spaced and distributed about the inner surface 56 of the absorber 15. While the tangential inlets 54 completely eliminate stagnation by the surface 56, the tangential inlets 54 also provide intense and turbulent mixing of the gas with the liquid redox solution, thereby eliminating the need for packing or static mixers, which are generally required in various prior contactor devices in order to ensure adequate contact of the gas with the liquid.

In the invention, the tangential gas flow resulting from the specified gas introduction generally does not permit or allow buildup of sulfur on the walls because of the continuous scraping action of the gas along the wall. As will be appreciated, one of ordinary skill in the art guided by the teachings of the present disclosure may vary the number and size of the gas inlets dependent upon the particulars of a specific design installation, such as required capacity, required or permissible pressure drop in the gas flow, etc. It will be appreciated that the distribution of the tangential gas inlet openings along the length of the housing will better ensure avoidance of the occurrence of non-moving fluid adjacent the internal surface of the housing along the length thereof.

The improved absorber of the invention is configured to replace existing packed tower and static mixer absorber systems. Thus, in accordance with one preferred embodiment, the absorber contactor of the invention constitutes an essentially hollow housing such as wherein one or more specified liquids and gases may contact and interact. The term "essentially hollow" is used to indicate that the housing is free of contact or mixing enhancing devices such as packing, static mixers and the like such as are commonly associated with contactor and absorber constructions. In the practice of the invention, the inclusion of such contact or mixing enhancing devices are in general undesired as such devices may undesirably hinder or preclude the desired turbulent mixing and sought avoidance of zones of stagnant fluid associated with fixed surfaces.

The tangential absorber 15 constitutes a gas-liquid contactor in which gas is introduced through tangential openings distributed through the wall of the absorber whereas the liquid is introduced axially either concurrently or countercurrently to the ultimate direction of the gas flow. In the illustrated embodiment of FIG. 2, the liquid is shown axially introduced in the direction of the arrow 60, countercurrently to the ultimate direction of the gas flow which, as shown in FIG. 1, is out from the top of the absorber 15, at the point 31.

As identified above and in accordance with one preferred embodiment of the invention, the described tangential absorber substantially eliminates stagnation points inside the absorber, such as are generally associated with packed-bed absorbers or absorbers containing a static mixer. It will be appreciated that the incidence of sulfur attachment and deposition on the internal surface of such as absorber is eliminated or drastically reduced.

In general, the absorber and liquid redox processing of the invention may advantageously be employed in conjunction with the processing of sulfur-containing streams containing sulfur in relative amounts of between about 100 ppm to no more than about 50 volume percent, measured in terms of hydrogen sulfide, with an upper concentration of sulfur of about 4 to 5 volume percent measured in terms of hydrogen sulfide being common for streams of natural gas processed in accordance with the invention.

It is to be understood that the discussion of theory, such as the discussion of the chemical interaction of hydrogen sulfide and the absorbent agent liquid redox solution, for example, is included to assist in the understanding of the subject invention and is in no way limiting to the invention in its broad application.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for removing hydrogen sulfide from a gas stream comprising the step of:

contacting a hydrogen sulfide containing gas stream with a liquid redox solution in a walled essentially hollow housing wherein the liquid redox solution is passed axially and the hydrogen sulfide containing gas stream is introduced through a plurality of gas inlet openings tangentially distributed about the housing resulting in tangential gas flow along the wall to eliminate stagnation at the wall and turbulent mixing of the liquid with the gas with at least a portion of the sulfur originally contained in the gas stream forming a solid, preventing deposition of solid sulfur on the internal surface of the housing.

2. The method of claim 1 wherein the hydrogen sulfide containing gas stream is a stream of hydrogen sulfide containing natural gas.

3. The method of claim 1 wherein the liquid redox solution comprises an iron-based absorbent agent.

4. The method of claim 1 wherein the occurrence of non-moving fluid adjacent surfaces within the housing is avoided.

5. A method for contacting a hydrogen sulfide containing gas with a liquid redox solution comprising the steps of:

passing a liquid redox solution axially through a contact zone of an elongated walled housing, introducing a hydrogen sulfide containing gas into the contact zone through a plurality of gas inlet openings tangentially distributed about the housing resulting in tangential gas flow along the housing wall and elimination of stagnation at the wall, and contacting the axially passing solution with the introduced gas to form solid sulfur;

wherein the tangential gas flow resulting from the introduction of the gas prevents deposition of the solid sulfur on the internal surface of the housing.

6. The method of claim 5 wherein the liquid redox solution comprises an iron-based absorbent agent.

7. The method of claim 5 wherein the hydrogen sulfide containing gas is hydrogen sulfide containing natural gas.

8. The method of claim 5 wherein the housing is free of added mixing devices.

9. The method of claim 5 wherein the hydrogen sulfide containing gas contains sulfur in a relative amount of between about 100 ppm and about 50 volume percent measured in terms of hydrogen sulfide.

10. The method of claim 9 wherein the hydrogen sulfide containing gas is natural gas containing no more than about 4 to 5 volume percent sulfur measured in terms of hydrogen sulfide.

* * * * *